(12) United States Patent
Nishidate

(10) Patent No.: US 9,716,418 B2
(45) Date of Patent: Jul. 25, 2017

(54) BRUSHLESS DC MOTOR

(71) Applicant: TOKYO PARTS INDUSTRIAL CO., LTD., Gunma-ken (JP)

(72) Inventor: Masahiro Nishidate, Gunma-ken (JP)

(73) Assignee: Tokyo Parts Industrial Co., Ltd (JP)

( * ) Notice: Subject to any disclaimer, the term of this patent is extended or adjusted under 35 U.S.C. 154(b) by 178 days.

(21) Appl. No.: 14/524,393

(22) Filed: Oct. 27, 2014

(65) Prior Publication Data
US 2015/0214811 A1    Jul. 30, 2015

(30) Foreign Application Priority Data
Jan. 30, 2014  (JP) .................................. 2014-15603

(51) Int. Cl.
*H02K 11/00* (2016.01)
*H02K 5/22* (2006.01)
*H02K 11/215* (2016.01)

(52) U.S. Cl.
CPC ............ *H02K 5/22* (2013.01); *H02K 11/215* (2016.01)

(58) Field of Classification Search
CPC .................. H02K 5/22; H02K 11/00

USPC ..................... 310/68 B, 214, 215
See application file for complete search history.

(56) References Cited

U.S. PATENT DOCUMENTS 5,895,994 A * 4/1999 Molnar ............... H02K 1/165
                                                  310/194
6,020,660 A * 2/2000 Wright ............... H02K 29/08
                                                  310/214

FOREIGN PATENT DOCUMENTS

JP        2008054390        3/2008

* cited by examiner

*Primary Examiner* — Hanh Nguyen
(74) *Attorney, Agent, or Firm* — Jordan and Koda, PLLC

(57) ABSTRACT

A electrically insulating member, which covers a stator core, has a plurality of engagement claws, which extend in the axial direction of a rotary shaft, and a plurality of positioning projections, at positions in the circumferential direction differing from those of the engagement claws, which extend further than the engagement claws. A sensor board, on which a plurality of magnetic sensors are fixed in place, has engagement parts, which engage with the engagement claws, and positioning recesses, into which the positioning projections are inserted.

13 Claims, 8 Drawing Sheets

BRUSHLESS DC MOTOR

BACKGROUND OF THE INVENTION

The present invention relates to a brushless DC motor, and in particular relates to technology for limiting variation in the capacity to detect the rotational position of the rotor.

Brushless DC motors comprise a stator having drive coils on the teeth of a core, a rotor having a magnet, and a sensor board having magnetic sensors that detect the position of the magnetic poles in this rotor. The rotor core is rotated by generating a rotating magnetic field, by way of successively electrifying each of the drive coils on the stator in accordance with the positions of the magnetic poles in the rotor, which are detected by this magnetic sensor.

With such a brushless DC motor, it is necessary to limit variation in the capacity to detect the rotational position of the rotor and, for this reason it is necessary to limit variation in the axial distance between the magnetic sensor and the magnet, while also limiting variation in the relative positions in the circumferential direction (rotational direction) of the teeth on the stator core and the magnetic sensors.

In terms of structures for positioning this magnetic sensor, in Japanese Patent Laid-Open Publication No. 2008-54390, an engagement claw that extends in the axial direction is provided at the end face of an electrically insulating member (insulator) that covers the stator, this engagement claw engaging with the end of the sensor board by way of being elastically deformed. Furthermore, anti-turn projections are provided along the inner face of the engagement claw in the axial direction, and the sensor board is rotationally positioned around a rotary shaft by advancing these anti-turn projections into positioning recesses that are provided at the peripheral edge of the sensor board.

With the magnetic sensor positioning structure described in Japanese Patent Laid-Open Publication No. 2008-54390, the axial position of the sensor board can be made constant and the variation in the axial distance between the magnetic sensor and the magnet can be suppressed. Furthermore, because the position of the sensor board is fixed in the circumferential direction by the anti-turn projections, the relative positions in the circumferential direction of the teeth, on the stator core and the magnetic sensor, can be made constant.

However, with the brushless DC motor described in Japanese Patent Laid-Open Publication No. 2008-54390, because anti-turn projections are provided on the inner face of the engagement claws of the electrically insulating member (insulator) which engage the sensor board, it is possible that, when the engagement claws are engaged with the sensor board by way of being elastically deformed, a slight position shift will occur between the anti-turn projections and the positioning recesses in the sensor board, in the circumferential direction.

If such a position shift occurs, a large force will be applied to the long thin engagement claws of the electrically insulating member, which may result in damage to the engagement claws. Furthermore, in order to correctly fit the anti-turn projections into the positioning recesses, it is necessary that these be rotated relative to each other. Thus, the positioning of the sensor board in the circumferential direction is troublesome, and there is a risk of damaging the engagement claws or the sensor board when the member is rotated.

Furthermore, in the brushless DC motor described in Japanese Patent Laid-Open Publication No. 2008-54390, because anti-turn projections are provided on the inner faces of the engagement claws that engage the sensor substrate, forming high anti-turn projections is detrimental to the elasticity of the engagement claws, and thus engagement with the sensor board is not easy. Meanwhile, if low anti-turn projections are formed, while this is not detrimental to the elasticity of the engagement claw, the anti-turn function may not be sufficient.

SUMMARY OF THE INVENTION

One or more embodiments of the present invention solve the problems described above, which are included in the prior art, and provide a brushless DC motor with which positioning of the magnetic sensors in the axial and circumferential directions can be easily and reliably performed, without the risk of damaging the electrically insulating member that covers the stator core or the sensor board. Note that, the constituent elements used in the aspects described below can be used in the most freely chosen combinations possible. Furthermore, the aspects and technical features of the present invention are not limited to those described hereafter, and are to be understood based on the description in the entire specification and the drawings, or based on the inventive ideas that can be grasped by the skilled artisan and on the basis of these descriptions.

A first aspect of the present invention relating to a brushless DC motor comprises:

a stator having a core that has: a plurality of teeth; an electrically insulating member fitted on the core; and drive coils wound on the teeth with the electrically insulating member therebetween;

a rotor, which has a rotary shaft and a magnet that has a plurality of poles fitted on the rotary shaft, and which is arranged inside the stator with a gap therebetween;

a plurality of magnetic sensors, which detect the positions of the poles of the magnet; and a sensor board, on which a plurality of magnetic sensors are fixed in place.

Here, the electrically insulating member has a plurality of engagement claws, which extend in the axial direction of the rotary shaft, and a plurality of positioning projections, at positions in the circumferential direction differing from those of the engagement claws, which extend further than the engagement claws in the axial direction of the rotary shaft.

Furthermore, the sensor board has a plurality of engagement parts, which engage with the plurality of engagement claws, and a plurality of positioning recesses, into which the plurality of positioning projections are inserted.

In a second aspect, the plurality of positioning projections extend in the axial direction of the rotary shaft further than the plurality of engagement claws by no less than half of the thickness of the sensor board. In a third aspect, the plurality of engagement claws are provided radially inward of the plurality of positioning projections. In a fourth aspect, the electrically insulating member has the same number of positioning projections as the number of teeth.

Furthermore, in a fifth aspect, the electrically insulating member has a plurality of cover parts, which cover the teeth, and a circular ring part, which interconnects the plurality of cover parts. In a sixth aspect, the ring part has a structure that connects thin parts and thick parts respectively corresponding to the plurality of cover parts. In a seventh aspect, the external diameter measurement of the thick part is substantially the same as the external diameter measurement of the core.

According to one or more embodiments of the present invention, the positioning projections on the electrically insulating member are inserted into the positioning recesses on the sensor board and the sensor board is positioned in the circumferential direction, before the sensor board is fixed in place on the electrically insulating member by way of engaging the engagement parts on the sensor board with the engagement claws of the electrically insulating member. As a result, when the sensor board is engaged by elastically deforming the engagement claws, the position of the sensor board will not shift in the circumferential direction. Accordingly, it is not necessary to rotate the sensor board in the circumferential direction so as to adjust the position after the sensor board has been engaged with the engagement claws, which effectively limits damage to the engagement claws of the electrically insulating member and the sensor board.

Furthermore, because the engagement claws of the electrically insulating member and the positioning projections are provided independently at mutually differing positions in the circumferential direction, even if the positioning projections are formed so as to be radially thick, in order to reliably prevent the sensor board from turning, this will not be detrimental to the elasticity of the engagement claws, and thus the sensor board can be fixed in place easily and reliably.

DETAILED DESCRIPTION OF THE PREFERRED EMBODIMENTS

Figure 1:
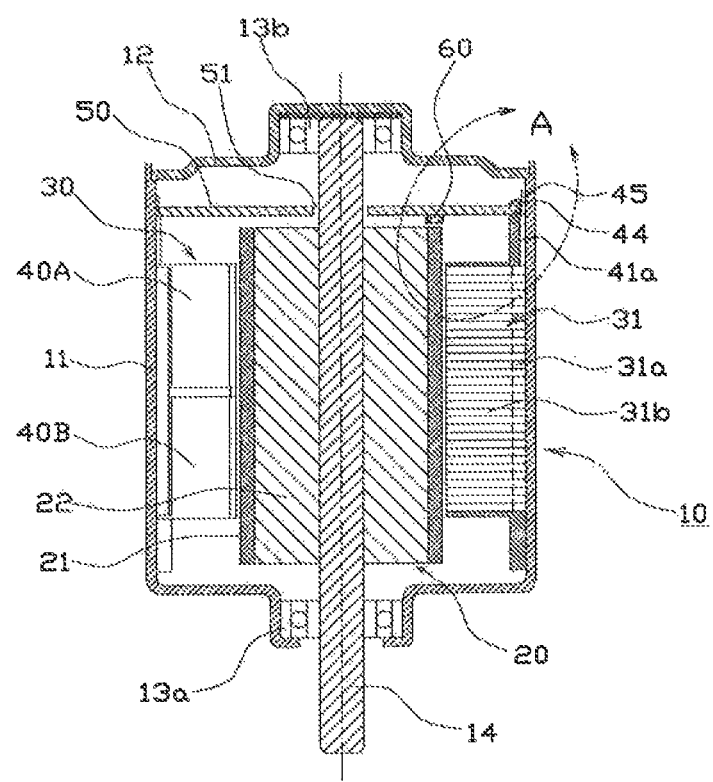
FIG. 1 is a longitudinal sectional view of a brushless DC motor according to a first exemplary embodiment of the present invention.
Figure 2:
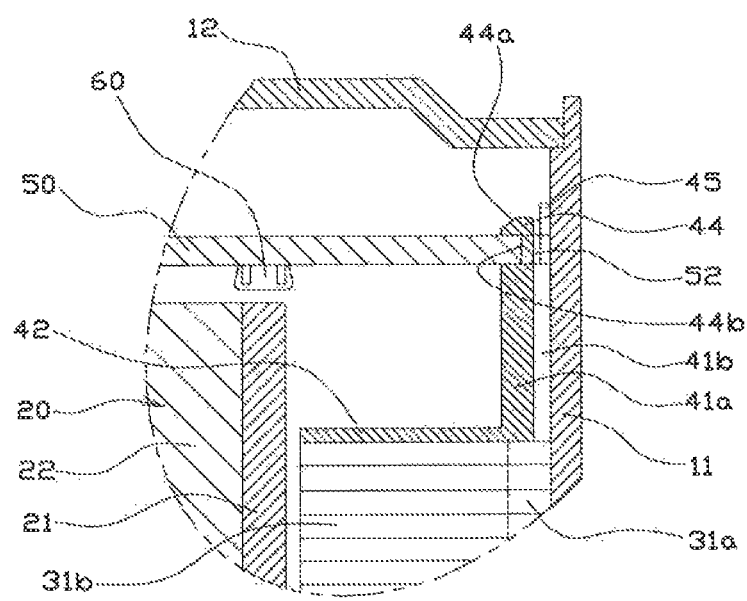
FIG. 2 is an enlarged sectional view of portion A in FIG. 1.
Figure 3:
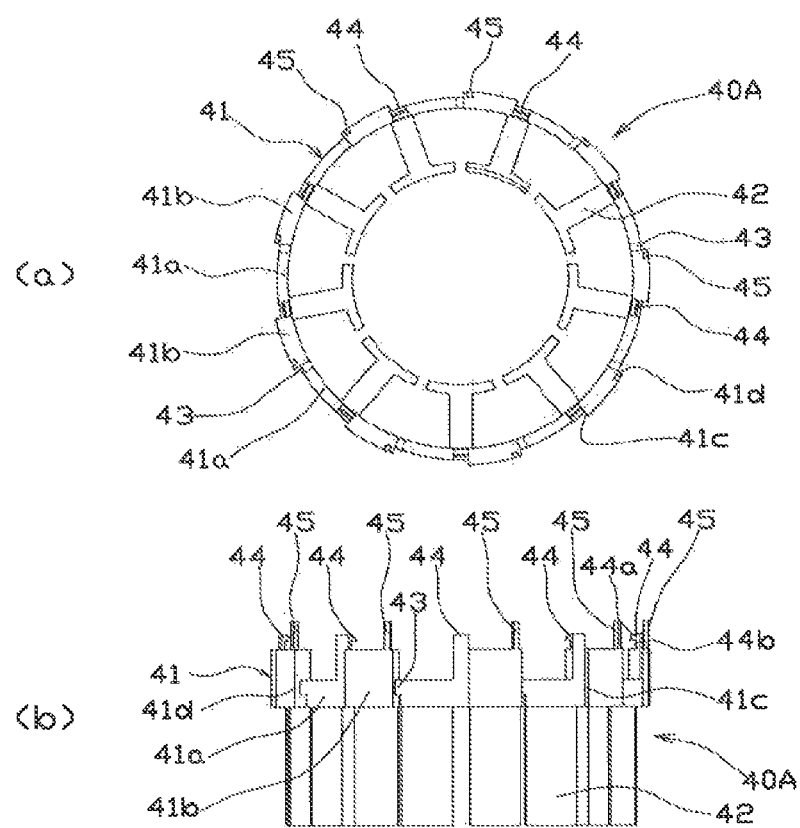
FIG. 3 shows the top electrically insulating member in the brushless DC motor according to the first embodiment of the present invention, wherein (a) is a plan view and (b) is a front view.
Figure 4:
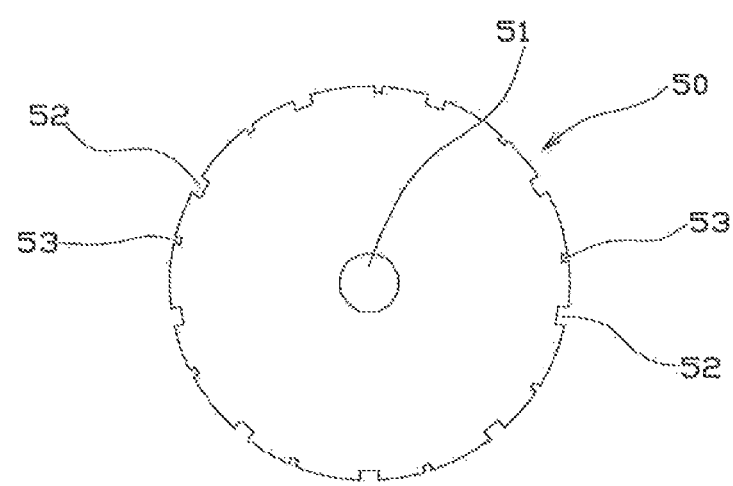
FIG. 4 is a plan view of the sensor board in the brushless DC motor according to the first embodiment of the present invention.

Hereafter, embodiments of the present invention are described in detail with reference to the drawings. Note that, in the present specification, expressions such as "above," "top" and "upper" are used in order to facilitate description, but the relative positions of the parts and the like are not necessarily limited thereby, and the top and bottom may be reversed, or these may constitute the left and the right. Accordingly, rephrasing is possible in which, for example "above" is replaced with "below" and "top" is replaced with "bottom."

First Exemplary Embodiment

A first exemplary embodiment of the present invention will be described using FIG. 1 to FIG. 4. The brushless DC motor 10 of this example is an inner-rotor type motor, wherein a rotor 20 and a stator 30 are arranged in a substantially cylindrical space formed by a bottomed cylindrical case 11 and a bracket 12, which is mounted in an upper opening of the case 11.

The rotor 20 comprises a rotor core 22 and a cylindrical multi-pole magnet 21, which is fastened to the outer periphery of this rotor core 22. A rotary shaft 14 is united with the rotor 20 by way of press fitting into the center thereof. The rotary shaft 14 is rotatably supported by a bearing 13a that is fitted at the bottom center of the case 11, and a bearing 13b that is fitted at the center of the bracket 12.

The stator 30 comprises a stator core 31, in which a multiplicity of stacked planar cores having 9 teeth 31b which protrude inwardly at uniform intervals from an annular outer peripheral part 31a; an electrically insulating member 40A, which covers the upper approximate one half of the stator core 31; an electrically insulating member 40B, which covers the lower approximately one half of the stator core 31; and drive coils (not shown), which are wound onto the teeth 31b with these electrically insulating members therebetween.

The stator 30 is fixed in place within the cylindrical portion of the case 11 by way of press fitting and arranged with a fixed gap between the forward end faces (radially inner faces) of the teeth 31b, which are not covered by the electrically insulating members 40A, 40B, and the periphery of the magnet 21 of the rotor 20.

Drive coils are connected for each phase (for example the U phase, V phase and W phase) and generate a rotating magnetic field with current from an inverter, which is not shown, so as to rotate the rotor 20.

A sensor board 50 is arranged in the vicinity of the top of the rotor 20, at a predetermined distance therefrom in the axial direction. Three magnetic sensors 60 are mounted on the bottom face of the sensor board 50, in order to detect the positions of the magnetic poles of the magnet 21 of the rotor 20 (note that, in FIG. 1, only one is shown). Well known Hall elements or Hall ICs can be used for these magnetic sensors 60.

The sensor board 50 is fixed in place above the top electrically insulating member 40 A, and a detail description will be given of the structure for fixing this sensor board 50 in place.

The basic configurations of the top electrically insulating member 40A and the bottom electrically insulating member 40B are the same, but engagement claws 44, which extend in the axial direction of the rotary shaft 14 (upwards in FIG. 1) and positioning projections 45 are provided on the top electrically insulating member 40A.

The electrically insulating members 40A and 40B comprise nine cover parts 42, which cover the teeth 31b of the stator core 31, and a ring part 41, which connects the top ends of these nine cover parts 42 in an circular shape.

The ring part 41 has a structure wherein nine pairs of thin parts 41a and thick parts 41b, corresponding to the respective nine cover parts 42, are connected by a connecting part 43.

The radially inward side of the ring part 41 is formed as a uniform annular face, while steps 41c, 42d are formed between the thin parts 41a and the thick parts 41b on the external diameter side. Note that the external diameter measurement of the thick parts 41b of the ring part 41 is substantially the same as the external diameter measurement of the stator core 31.

Engagement claws 44, which are all of the same shape, extending axially upward, are respectively formed on the nine thin parts 41a of the top electrically insulating member 40A. The positions in the circumferential direction of the engagement claws 44 coincide with the positions in the circumferential direction of the cover parts 42. The engagement claws 44 have elastically deformable structures, so as to be able to bend in the radial direction. Furthermore, the engagement claws 44 are formed in a hook shape, and have a sloped part 44a, which is sloped, on the radially inward side, at the tip. Directly below, a recessed fitting part 44b is formed on the inside of the engagement claw 44, the axial length of this recessed fitting part 44b being equal to the thickness of the sensor board 50.

Furthermore, positioning projections 45, which are all the same shape, are formed extending in the axial direction on each of the nine thick parts 41b of the top electrically insulating member 40A. In other words, the positioning projections 45 are formed independently of the engagement claws 44, at different positions therefrom in the circumferential direction. These positioning projections 45 are formed with a quadrangular prism shape, and the tips thereof are higher than the tips of the engagement claws 44.

The difference in height between the positioning projections 45 and the engagement claws 44 is preferably no less than half of the thickness of the sensor board 50, so that positioning of the sensor board 50 in the circumferential direction can be reliably performed before the sensor board 50 is fixed in place on the electrically insulating member 40A, and in this example, this is established at approximately three quarters of the thickness of the sensor board 50.

Note that, in this example, the engagement claws 44 are provided slightly to the radial interior of the positioning projections 45. Specifically, when the sensor board 50 is fixed in place on the electrically insulating member 40A, the engagement claws 44 are bent radially outward, and the engagement claws 44 are provided to the radial interior of the positioning projections 45 by an amount equal to or greater than this bending amount.

The sensor board 50 is a generally circular board provided with a central hole 51 at the center, through which the rotary shaft 14 is inserted. The diameter of this central hole 51 is slightly greater than the diameter of the rotary shaft 14, such that the sensor board 50 does not touch the rotary shaft 14.

The sensor board 50 is provided in nine places with respective identically shaped engagement parts 52, which engage with the engagement claws 44, and with respective positioning recesses 53, which fit with the positioning projections 45.

The engagement parts 52 and the positioning recesses 53 are both formed by cutting out approximately rectangular shapes in the outer edge of the sensor board 50. Note that the planar shape of the positioning recess 53 is the same as the sectional shape of the positioning projection 45 in a plane perpendicular to the axial direction.

When the sensor board 50 is fixed in place above the electrically insulating member 40A, the positioning projections 45 on the electrically insulating member 40A are first inserted into the positioning recesses 53 on the sensor board 50. As a result, the position in the circumferential direction of the sensor board 50, with respect to the electrically insulating member 40A, is fixed and the positions of the engagement claws 44 and the engagement parts 52 in the circumferential direction are aligned.

Then, when the sensor board 50 is pressed downward, the sloped parts 44a of the engagement claws 44 slide against the bottom edge of the radially inward side of the engagement part 52, bending the engagement claw 44 outward in the radial direction, so that the sensor board 50 fits into the recessed fitting part 44b. As a result, the engagement claws 44 are locked on the radially inward upper edge of the engagement parts 52, so that the sensor board 50 is fixed in place.

When the sensor board 50 is fixed in place on the electrically insulating member 40A, the distance between the bottom face of the sensor board 50 and the magnet 21 is maintained at a predetermined value. Consequently, the three magnetic sensors 60 that are mounted on the bottom face of the sensor board 50 fall within the magnetic field of the magnet 21, and can reliably detect the magnetic flux from the magnet 21.

Thus, in the brushless DC motor of this example, the electrically insulating member 40A is provided with a plurality of engagement claws 44, which extend in the axial direction of the rotary shaft 14, and a plurality of positioning projections 45, at different positions in the circumferential direction than these engagement claws 44, which extend further than the engagement claws 44 in the axial direction of the rotary shaft 14. Meanwhile, the sensor board 50 is provided with engagement parts 52, which engage with the engagement claws 44, and positioning recesses 53 into which the positioning projections 45 are inserted.

With the brushless DC motor of this example, which has such a configuration, before the sensor board 50 is fixed in place on the electrically insulating member 40A, the positioning projections 45 are inserted into the positioning recesses 53 and the sensor board 50 is positioned in the circumferential direction. As a result, the sensor board 50 can be engaged by elastically deforming the engagement claws 44 after the sensor board 50 has been positioned in the circumferential direction, such that the position of the sensor board 50 is not shifted in the circumferential direction. Accordingly, it is not necessary to rotate the sensor board 50 with respect to the electrically insulating member 40A after the sensor board 50 has been engaged with the engagement claws 44, whereby damage to the engagement claws 44 and the sensor board 50 can be avoided. Furthermore, because the engagement claws 44 and the positioning projections 45 are provided at mutually differing positions in the circumferential direction, even if the positioning projections 45 are formed so as to be radially thick, in order to reliably prevent the sensor board 50 from turning, this will not be detrimental to the elasticity of the engagement claws 44, and thus the sensor board 50 can be fixed in place easily.

Note that, in the DC motor of this example, the engagement claws 44 are provided to the radial interior of the positioning projections 45. As a result, a suitable design is possible in which the engagement claws 44 do not strike the inside of the case 11, even if the engagement claws 44 are bent to the exterior in the radial direction when the sensor board 50 is fixed in place on the electrically insulating member 40A. As a result the sensor board 50 can be fixed in place on the electrically insulating member 40A with the stator 30 fixed in place inside the case 11, such that the motor can be assembled very easily.

Furthermore, with the brushless DC motor of this example, the same number of positioning projections 45 are provided on the electrically insulating member 40A as the number of teeth 31b on the stator core 31. As a result, the sensor board 50 can be fixed in place at a predetermined position in the circumferential direction, regardless of the starting position of the drive coils wound on the teeth 31b.

Second Exemplary Embodiment

Figure 5:
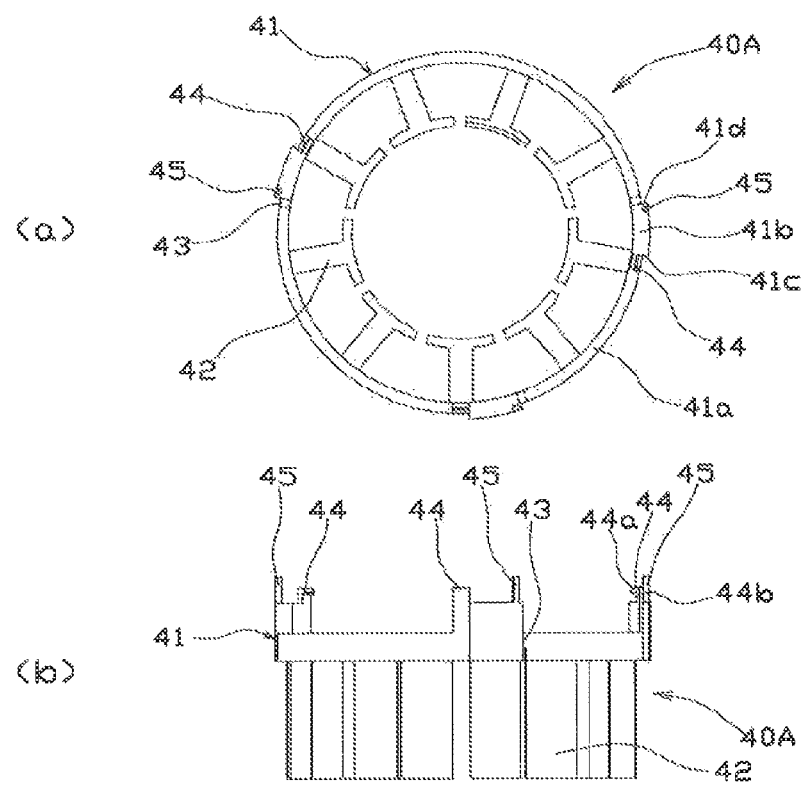
FIG. 5 shows the top electrically insulating member in the brushless DC motor according to a second embodiment of the present invention, wherein (a) is a plan view and (b) is a front view.
Figure 6:
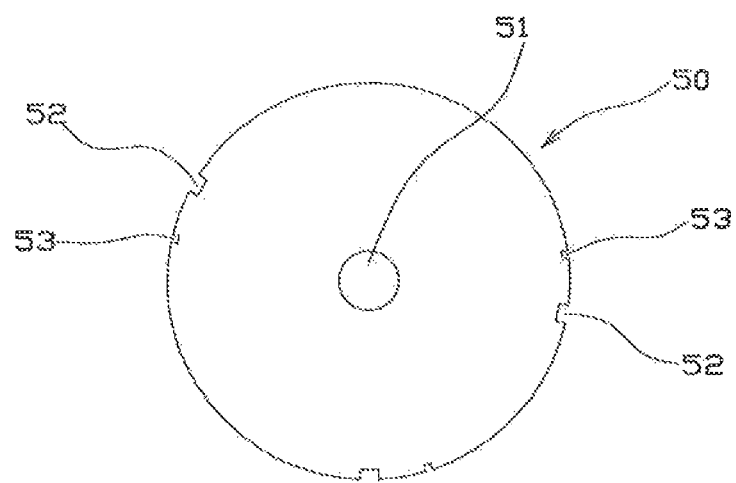
FIG. 6 is a plan view of the sensor board in the brushless DC motor according to the second embodiment of the present invention.

A second exemplary embodiment of the present invention will be described using FIG. 5 and FIG. 6. In FIG. 5 and FIG. 6, the same reference numerals are used as were used for equivalent members and parts in FIG. 3 and FIG. 4, and redundant description has been omitted. Note that the basic configuration of the brushless DC motor in this example is the same as in FIG. 1.

In this example as well, a plurality of engagement claws 44, which extend in the axial direction of the rotary shaft 14, and a plurality of positioning projections 45, at different positions in the circumferential direction than these engagement claws 44, which extend further than the engagement claws 44 in the axial direction of the rotary shaft 14, are provided on the top electrically insulating member 40A. Furthermore, the sensor board 50 is provided with engagement parts 52, which engage with the engagement claws 44, and positioning recesses 53 into which the positioning projections 45 are inserted.

In the first exemplary embodiment, the same number of engagement claws 44, positioning projections 45, engagement parts 52 and positioning recesses 53 were provided as the number of teeth 31b on the stator core 31 (nine), but in this example only three of each are provided. Note that there may be any number, greater than or equal to three, of engagement claws 44 and engagement parts 52.

The positions in the circumferential direction of the three engagement claws 44 correspond to the positions in the circumferential direction of three of the cover parts 42 from among the nine cover parts 42, but all three are provided at differing intervals, with the intervals in the circumferential direction having center angles of 800, 120° and 160° respectively. The positioning projections 45, the engagement parts 52 and the positioning recesses 53 are likewise all provided at differing intervals, with the intervals in the circumferential direction having center angles of 80°, 120° and 160°, respectively.

In this example as well, the sensor board 50 can be engaged by elastically deforming the engagement claws 44 after the sensor board 50 has been positioned in the circumferential direction, such that the position of the sensor board 50 does not shift in the circumferential direction. Furthermore, because the engagement claws 44 and the positioning projections 45 are provided at mutually differing positions in the circumferential direction, even if the positioning projections 45 are formed so as to be radially thick, in order to reliably prevent the sensor board 50 from turning, this will not be detrimental to the elasticity of the engagement claws 44, and thus the sensor board 50 can be fixed in place easily.

Furthermore, in this example, the sensor board 50 can be fixed in place on the electrically insulating member 40A at the minimum necessary number of places, such that it is easily possible to limit the variation in the axial distance between the magnetic sensor 60 and the magnet 21, and is easily possible to limit the variation in the relative positions in the circumferential direction of the teeth 31b on the stator core 31 and the magnetic sensor 60. Furthermore, in this example, the three engagement claws 44, positioning projections 45, engagement parts 52 and positioning recesses 53 are all provided at differing intervals in the circumferential direction, whereby a fixed position is unambiguously defined for the sensor board 50, with respect to the electrically insulating member 40A. Consequently, there will be no mistakes in terms of the mounting position in the circumferential direction of the sensor board 50.

Third Exemplary Embodiment

Figure 7:
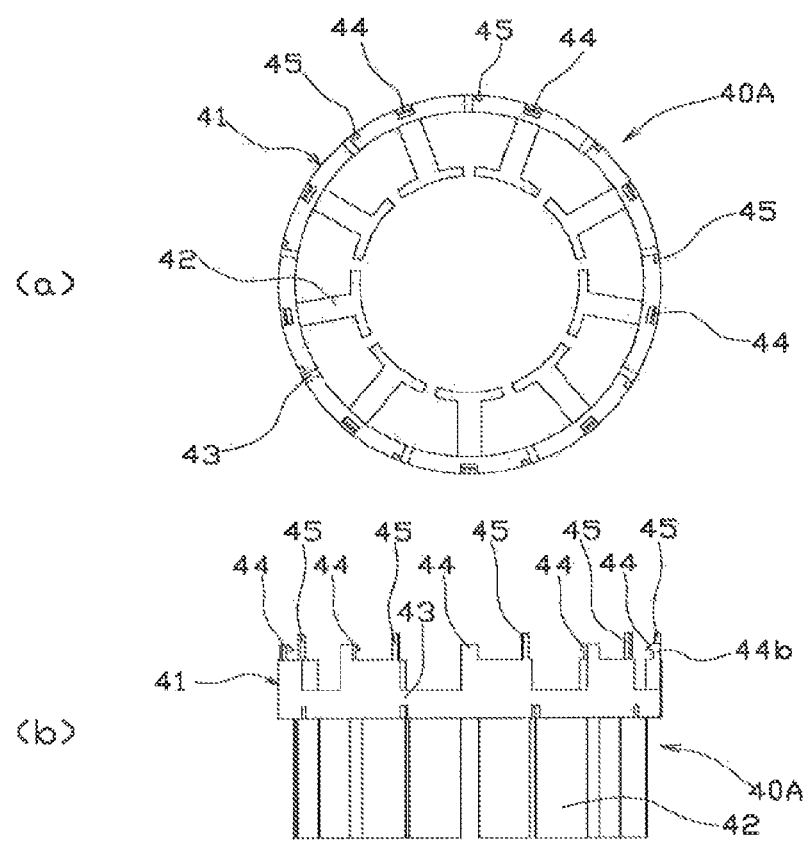
FIG. 7 shows the top electrically insulating member in the brushless DC motor according to a third embodiment of the present invention, wherein (a) is a plan view and (b) is a front view.
Figure 8:
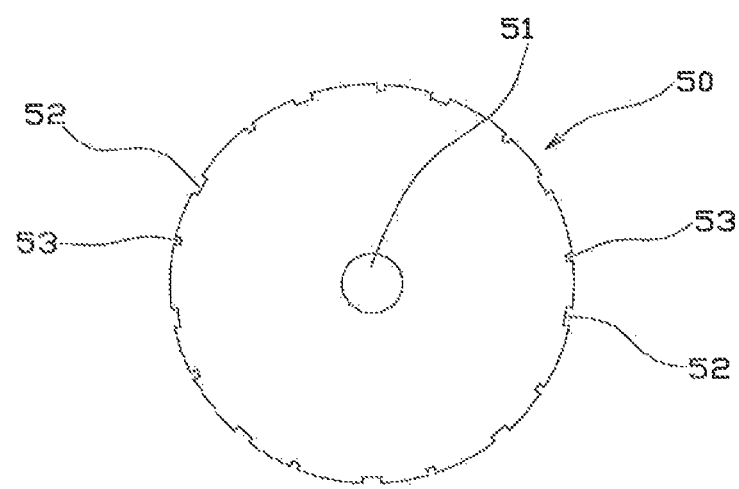
FIG. 8 is a plan view of the sensor board in the brushless DC motor according to the third embodiment of the present invention.

A third exemplary embodiment of the present invention will be described using FIG. 7 and FIG. 8. In FIG. 7 and FIG. 8, the same reference numerals are used as were used for equivalent members and parts in FIG. 3 and FIG. 4, and redundant description has been omitted. Note that the basic configuration of the brushless DC motor in this example is the same as in FIG. 1.

In this example as well, a plurality of engagement claws 44, which extend in the axial direction of the rotary shaft 14, and a plurality of positioning projections 45, at different positions in the circumferential direction than these engagement claws 44, which extend further than the engagement claws 44 in the axial direction of the rotary shaft 14, are provided on the top electrically insulating member 40A. Furthermore, the sensor board 50 is provided with engagement parts 52, which engage with the engagement claws 44, and positioning recesses 53 into which the positioning projections 45 are inserted.

In the first exemplary embodiment, a thin part 41a and a thick part 41b were provided on the ring part 41 of the electrically insulating member 40A, but in this example, the entire ring part 41 is formed to the same thickness as the thick part 41b.

Furthermore, in the first exemplary embodiment, the engagement claws 44 were provided to the radial interior of the positioning projections 45, but in this example, the engagement claws 44 and the positioning projections 45 are provided on the same circumferential plane.

In this example as well, the sensor board 50 can be engaged by elastically deforming the engagement claws 44 after the sensor board 50 has been positioned in the circumferential direction, such that the position of the sensor board 50 does not shift in the circumferential direction. Furthermore, because the engagement claws 44 and the positioning projections 45 are provided at mutually differing positions in the circumferential direction, even if the positioning projections 45 are formed so as to be radially thick, in order to reliably prevent the sensor board 50 from turning, this will not be detrimental to the elasticity of the engagement claws 44, and thus the sensor board 50 can be fixed in place easily.

In this example, the sensor board 50 cannot be fixed in place on the electrically insulating member 40A with the stator 30 fixed in place inside the case 11. Meanwhile, the external diameter of the ring part 41 is made approximately the same as the internal diameter of the case 11 and the engagement claws 44 stand at the edge of the ring part 41, whereby if the stator 30 is fixed in place inside the case 11 with the sensor board 50 fixed in place on the electrically insulating member 40A in advance, radially outward bending of the engagement claws 44 can be limited by the case 11. As a result, the sensor board 50 can be more securely fixed in place, undue vibration can be limited, and the axial distance between the magnetic sensor and the magnet can be maintained constant.

Three exemplary embodiments of the present invention were described above, but the present invention is not limited to these exemplary embodiments, and the exemplary embodiments described above can be suitably modified within a range that does not depart from the gist of the present invention. For example, the specific shapes and numbers of the engagement claws and positioning projections that are formed on the electrically insulating member, as well as those of the engagement parts and positioning recesses that are formed in the sensor board can be arbitrarily established so long as similar effects are produced. Furthermore, the number of poles on the magnets in the rotor, and the number of teeth on the stator core can be arbitrarily established. Further, the shapes of the case and the brackets and the assembly structures of the same can also be arbitrarily established.

What is claimed is:

1. A brushless DC motor comprising:
a stator, which has a core that has a plurality of teeth, an electrically insulating member fitted on the core, and drive coils wound on the teeth with the electrically insulating member therebetween;
a rotor, which has a rotary shaft and a magnet that has a plurality of poles fitted on the rotary shaft, and which is arranged inside the stator with a gap therebetween;
a plurality of magnetic sensors, which detect the positions of the poles of the magnet; and
a sensor board, on which a plurality of magnetic sensors are fixed in place, wherein the electrically insulating member has a plurality of engagement claws, which extend in the axial direction of the rotary shaft, and a plurality of positioning projections, at positions in the circumferential direction differing from those of the engagement claws, which extend further than the engagement claws in the axial direction of the rotary shaft, and wherein the sensor board has a plurality of engagement parts, which engage with the plurality of engagement claws, and a plurality of positioning recesses, into which the plurality of positioning projections are inserted; and
wherein the plurality of positioning projections extend in the axial direction of the rotary shaft further than the plurality of engagement claws by no less than half of the thickness of the sensor board.

2. The brushless DC motor recited in claim 1, wherein the plurality of engagement claws are provided radially inward of the plurality of positioning projections.

3. The brushless DC motor recited in claim 1, wherein the electrically insulating member has the same number of positioning projections as the number of teeth.

4. The brushless DC motor recited in claim 1, wherein the electrically insulating member has a plurality of cover parts, which cover the teeth, and a circular ring part, which interconnects the plurality of cover parts.

5. The brushless DC motor recited in claim 1, wherein the plurality of positioning projections extend in the axial direction of the rotary shaft further than the plurality of engagement claws by no less than half of the thickness of the sensor board, and the plurality of engagement claws are provided radially inward of the plurality of positioning projections.

6. The brushless DC motor recited in claim 5, wherein the electrically insulating member has the same number of positioning projections as the number of teeth.

7. A brushless DC comprising:
a stator, which has a core that has a plurality of teeth, an electrically insulating member fitted on the core, and drive coils wound on the teeth with the electrically insulating member therebetween;
a rotor, which has a rotary shaft and a magnet that has a plurality of poles fitted on the rotary shaft, and which is arranged inside the stator with a gap therebetween;
a plurality of magnetic sensors, which detect the positions of the poles of the magnet; and
a sensor board, on which a plurality of magnetic sensors are fixed in place;
wherein the electrically insulating member has a plurality of engagement claws, which extend in the axial direction of the rotary shaft, and a plurality of positioning projections, at positions in the circumferential direction differing from those of the engagement claws, which extend further than the engagement claws in the axial direction of the rotary shaft;
wherein the sensor board has a plurality of engagement parts, which engage with the plurality of engagement claws, and a plurality of positioning recesses, into which the plurality of positioning projections are inserted;
wherein the electrically insulating member has a plurality of cover parts, which cover the teeth, and a circular ring part, which interconnects the plurality of cover parts; and
wherein the ring part has a structure that connects thin parts and thick parts respectively corresponding to the plurality of cover parts.

8. The brushless DC motor recited in claim 7, wherein the external diameter measurement of the thick part is the same as the external diameter measurement of the core.

9. A brushless DC motor comprising:
a stator, which has a core that has a plurality of teeth, an electrically insulating member fitted on the core, and drive coils wound on the teeth with the electrically insulating member therebetween;
a rotor, which has a rotary shaft and a magnet that has a plurality of poles fitted on the rotary shaft, and which is arranged inside the stator with a gap therebetween;
a plurality of magnetic sensors, which detect the positions of the poles of the magnet; and
a sensor board, on which a plurality of magnetic sensors are fixed in place, wherein the electrically insulating member has a plurality of engagement claws, which extend in the axial direction of the rotary shaft, and a plurality of positioning projections, at positions in the circumferential direction differing from those of the engagement claws, which extend further than the engagement claws in the axial direction of the rotary shaft, and wherein the sensor board has a plurality of engagement parts, which engage with the plurality of engagement claws, and a plurality of positioning recesses, into which the plurality of positioning projections are inserted; and
wherein the electrically insulating member has a plurality of cover parts, which cover the teeth, and a circular ring part, which interconnects the plurality of cover parts, the ring part has a structure that connects thin parts and thick parts respectively corresponding to the plurality of cover parts, and the external diameter measurement of the thick part is the same as the external diameter measurement of the core.

10. The brushless DC motor recited in claim 9, wherein the plurality of positioning projections extend in the axial direction of the rotary shaft further than the plurality of engagement claws by no less than half of the thickness of the sensor board.

11. The brushless DC motor recited in claim 9, wherein the plurality of engagement claws are provided radially inward of the plurality of positioning projections.

12. The brushless DC motor recited in claim 9, wherein the electrically insulating member has the same number of positioning projections as the number of teeth.

13. The brushless DC motor recited in claim 9, wherein the plurality of positioning projections extend in the axial direction of the rotary shaft further than the plurality of engagement claws by no less than half of the thickness of the sensor board.

* * * * *